(12) United States Patent
Vallabhu et al.

(10) Patent No.: US 10,098,041 B2
(45) Date of Patent: Oct. 9, 2018

(54) VOICE HANDOVER BETWEEN WIRELESS NETWORKS

(71) Applicant: Intel Corporation, Santa Clara, CA (US)

(72) Inventors: Venkata R. Vallabhu, Aloha, OR (US); Suresh Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 14/582,020

(22) Filed: Dec. 23, 2014

(65) Prior Publication Data

US 2016/0183144 A1 Jun. 23, 2016

(51) Int. Cl.
*H04L 12/66* (2006.01)
*H04W 36/00* (2009.01)

(52) U.S. Cl.
CPC .............................. *H04W 36/0011* (2013.01)

(58) Field of Classification Search
CPC ... H04L 12/66; H04L 63/164; H04L 42/6418; H04L 67/28; H04W 92/00; H04W 92/02; H04W 92/04; H04W 36/0022; H04W 36/00; H04W 36/0005; H04W 36/06; H04W 36/05; H04W 36/14; H04W 72/02; H04W 72/12; H04W 36/0083; H04W 36/0011; G06F 15/173; H04M 15/00
USPC ........... 370/328–332, 352–356, 389, 395.21; 455/452, 422
See application file for complete search history.

(56) References Cited

U.S. PATENT DOCUMENTS

| | | | |
|---|---|---|---|
| 7,958,233 B2* | 6/2011 | Fernandez Gutierrez | ................... H04M 3/2281 370/252 |
| 7,986,665 B2* | 7/2011 | Kezys | ................. H04L 12/6418 370/261 |
| 8,116,776 B1* | 2/2012 | Jagadeesan | ........... H04W 36/00 370/331 |
| 8,542,668 B2* | 9/2013 | Kottilingal | ........ H04L 29/06027 370/331 |

(Continued)

FOREIGN PATENT DOCUMENTS

EP 2712232 A2 3/2014
WO 2007025158 A1 3/2007

OTHER PUBLICATIONS

International Search Report, PCT No. PCT/US2015/054931, dated Jan. 27, 2016, 3 pages.

(Continued)

*Primary Examiner* — Hanh N Nguyen
(74) *Attorney, Agent, or Firm* — International IP Law Group, P.L.L.C.

(57) ABSTRACT

An apparatus for the handover of a transmission of a data application. The apparatus includes a computer device, and the computer device includes a wireless receiver and a wireless transmitter. The data application is transmitted over a first wireless network. The computer device includes a handover (SH) proxy. The VoIP handover proxy is to maintain the transmission of the data application while the transmission and state of the data application switches from being transmitted over the first wireless network to being transmitted over a second wireless network. During the switch between wireless networks, the data application is unaware of the switch, and seamless mobility is achieved by using the VoIP handover proxy.

23 Claims, 6 Drawing Sheets

(56) References Cited

U.S. PATENT DOCUMENTS

| | | | |
|---|---|---|---|
| 8,725,148 B2* | 5/2014 | George | H04L 12/66 |
| | | | 370/331 |
| 9,167,486 B2* | 10/2015 | Bachmann | H04L 63/164 |
| 2006/0121891 A1* | 6/2006 | Jagadeesan | H04W 36/14 |
| | | | 455/417 |
| 2007/0180088 A1* | 8/2007 | Zhao | H04L 67/28 |
| | | | 709/223 |
| 2007/0195732 A1 | 8/2007 | Akram et al. | |
| 2009/0201878 A1 | 8/2009 | Kotecha et al. | |
| 2009/0285175 A1 | 11/2009 | Nix | |
| 2011/0319083 A1 | 12/2011 | Lee | |
| 2014/0079023 A1 | 3/2014 | Lindsay et al. | |

OTHER PUBLICATIONS

Supplementary European Search Report for European Patent Application EP 15873876 dated Jul. 17, 2018, 3 pages.

Anchour, A., et al.: "A SIP-SHIM6-Based Solution Providing Interdomain Service Continuity in IMS-Based Networks", IEEE Communications Magazine, IEEE Service Center, vol. 50, No. 7, Jul. 2012, 12 pages.

* cited by examiner

VOICE HANDOVER BETWEEN WIRELESS NETWORKS

FIELD

The present techniques generally relate to data transmission over wireless communication networks. More specifically, the present invention relates to the handover between different wireless networks while maintaining the transmission and state of a running application.

BACKGROUND

Mobile computer devices are becoming more ubiquitous as more consumers become end users of the devices. Smartphones, tablets and other computer devices include technologies that support transmission of wireless signals. These wireless signals can be based on radio transmissions, such as a wireless local area network (WLAN), or wireless wide area network (WWAN). Other wireless signals used for the transmission of data between mobile computer devices also include Bluetooth®, and Worldwide Interoperability for Microwave Access (WiMAX), to name a few. Many computer devices can support multiple types of wireless transmissions, through various hardware and software method that are well known.

DESCRIPTION OF THE EMBODIMENTS

Figure 1:
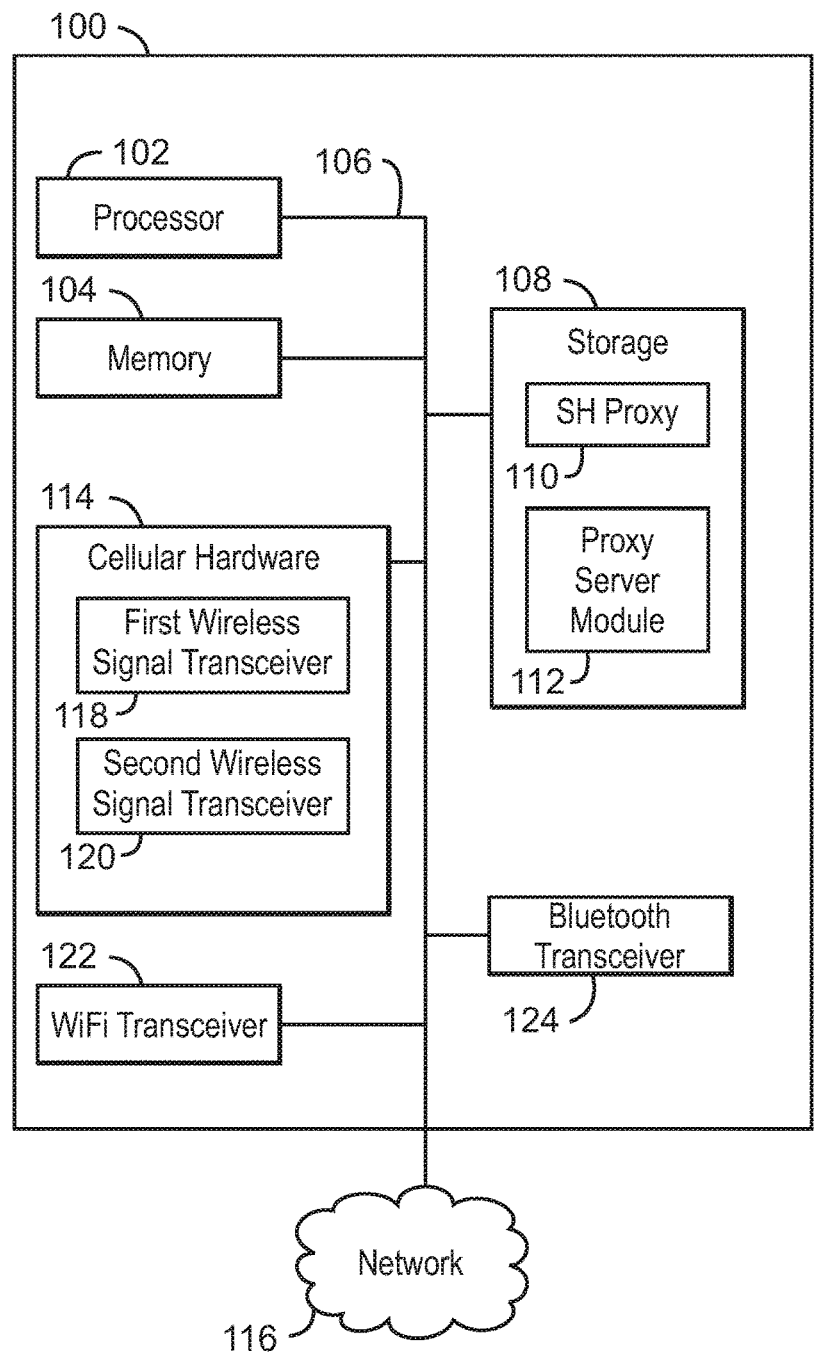
FIG. 1 is a block diagram of a computer device that enables handover for the transmission of data between heterogeneous transmission signals.

The increased demand for mobile applications and mobile devices, such as smart phones, tablets, and laptops or laptop-tablet hybrids, for example, has generated an increase in applications and data transferred between mobile devices. Voice-based applications, among others, play a vital role in the use and function of mobile devices. An issue with voice-based applications is they do not seamlessly handover voice calls between, for example, a wireless local area network (WLAN), and a wireless wide area network (WWAN). A main reason for the complication in handovers between different transmission signals can be because when an active connection changes data transfer between WLAN and WWAN, the session initiation protocol (SIP), real-time transport protocol (RTP), or RTP control protocol (RTCP) based sessions, for example, are deconstructed and the voice call breaks down. Current technologies propose either an application change or an infrastructure overhaul. The technology described herein provides for infrastructure-less handover of an application transmitted between heterogeneous transmission signals. The techniques herein can be beneficial for mobile device users that do not have cellular phone service or infrastructure, and that use Wireless Fidelity (WiFi™) as the primary network infrastructure. The techniques herein can be implemented for protocols and technology that include, for example, Internet Protocol (IP) Multimedia Subsystem (IMS), Voice Call Continuity (VCC), and Unlicensed Mobile Access (UMA), to name a few.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as mobile devices, handheld devices, tablets, other thin notebooks, systems on a chip (SOC) devices, and embedded applications. Some examples of handheld devices or mobile devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computer device that enables a handover for the transmission of data between heterogeneous transmission signals. The electronic device 100 may be, for example, a laptop computer, tablet computer, mobile phone, smart phone, a wearable headset, a smart headset, a smart glass or speaker system, among others. The computer device 100 may include a processor 102 that is configured to execute stored instructions, as well as a memory device 104 that stores instructions that are executable by the processor 102. The processor may be coupled to the memory device 104 by a bus 106. The bus 106 may be an on board bus, can include peripheral component interconnect (PCI), or peripheral component interconnect express (PICe) ports, or any other appropriate electrical bus infrastructure. Additionally, the processor 102 can be a single core processor, a multi-core processor, a computing cluster, or any number of other configurations. Further, the computer device 100 may include more than one processor 102. The memory device 104 can include random access memory (RAM), read only memory (ROM), flash memory, or any other suitable memory systems. For example, the memory device 104 may include dynamic random access memory (DRAM), or the like.

The computer device 100 can also include storage device 108. The storage device 108 is a physical memory such as a hard drive disk, a solid state drive, an optical drive, a flash drive, an array of drives, or any combinations thereof. The storage device 108 can store data, such as, for example, data applications, application plugins, Voice over IP (VoIP) based applications, Session Initiation Protocol (SIP) based applications, Real-Time Transport Protocol (RTP) based applications, RTP Control Protocol (RTCP) based applications, Google Talk based applications, Skype based applications, audio files, video files, audio/video files, and picture files, among others. The storage device 108 can store applications that utilize or are based on the data transfer protocols listed, or any other compatible data transfer protocol used for a wireless transmission, for example, Worldwide Interoperability for Microwave Access (WiMAX). The storage device 108 can also store programming code such as device drivers, operating systems, and the like. The programming code stored to the storage device 108 may be executed by the processor 102, or any other processors that may be included in the computer device 100, such as a graphics processing unit (GPU).

The storage device 108 includes a Voice over Internet Protocol (VoIP) handover proxy 110 and a proxy server module 112. The VoIP handover proxy 110 is to enable the seamless handover of the transmission of a running application from a first wireless network to a second wireless network. The handover between wireless networks is made transparently to the running application being transmitted, so that interruptions in the transmission and degradation of the running application are avoided. The proxy server module 112 can act as an intermediary for requests and data transmissions between, for example, computer device 100 and a server, or computer device 100 and another computer device, or computer device 100 and a server and another computer device.

The processor 102 may be linked through the bus 106 to cellular hardware 114. The cellular hardware 114 may be any cellular technology, for example, the 4G standard (International Mobile Telecommunications-Advanced (IMT-Advanced) Standard promulgated by the International Telecommunications Union—Radio communication Sector (ITU-R)). In this manner, the computer device 100 may access a network 116 without being tethered or paired to another device, where the network 116 is a cellular network. The cellular hardware 114 includes a first wireless signal transceiver 118 and a second wireless signal transceiver 120. The first wireless signal transceiver 118 and the second wireless signal transceiver 120 can be configured to transmit wireless signals, for example, WWAN, WLAN, WiMAX, or any type of compatible, low frequency, wireless transmission.

The processor 102 may also be linked through the bus 106 to WiFi™ transceiver 122. The WiFi™ transceiver 122 is hardware according to WiFi™ standards (promulgated as Institute of Electrical and Electronics Engineers' (IEEE) 802.11 standards). The WiFi™ transceiver 122 can enable the computer device 100 to connect to the Internet using the Transmission Control Protocol and the Internet Protocol (TCP/IP), for example. The network 116 may be the Internet. Accordingly, the computer device 100 can enable end-to-end connectivity with the Internet by addressing, routing, transmitting, and receiving data according to the TCP/IP protocol without the use of another device. Additionally, a Bluetooth® transceiver 124 may be coupled to the processor 102 through the bus 106. The Bluetooth® transceiver 124 is an interface according to Bluetooth® networks (based on the Bluetooth® standard promulgated by the Bluetooth® Special Interest Group). The Bluetooth® transceiver 124 enables the computer device 100 to be paired with other Bluetooth® enabled devices through a personal area network (PAN), for example. Accordingly, the network 116 may be a PAN. Examples of Bluetooth® enabled devices include a mobile device, laptop computer, desktop computer, tablet computer, or server, among others.

The block diagram of FIG. 1 is not intended to indicate that the computer device 100 is to include all of the components shown in FIG. 1. Rather, the computer device 100 can include fewer or additional components not illustrated in FIG. 1 (e.g., sensors, power management integrated circuits, additional network interfaces, etc.). The computer device 100 may include any number of additional components not shown in FIG. 1, depending on the details of the specific implementation. Furthermore, any of the functionalities of the processor 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
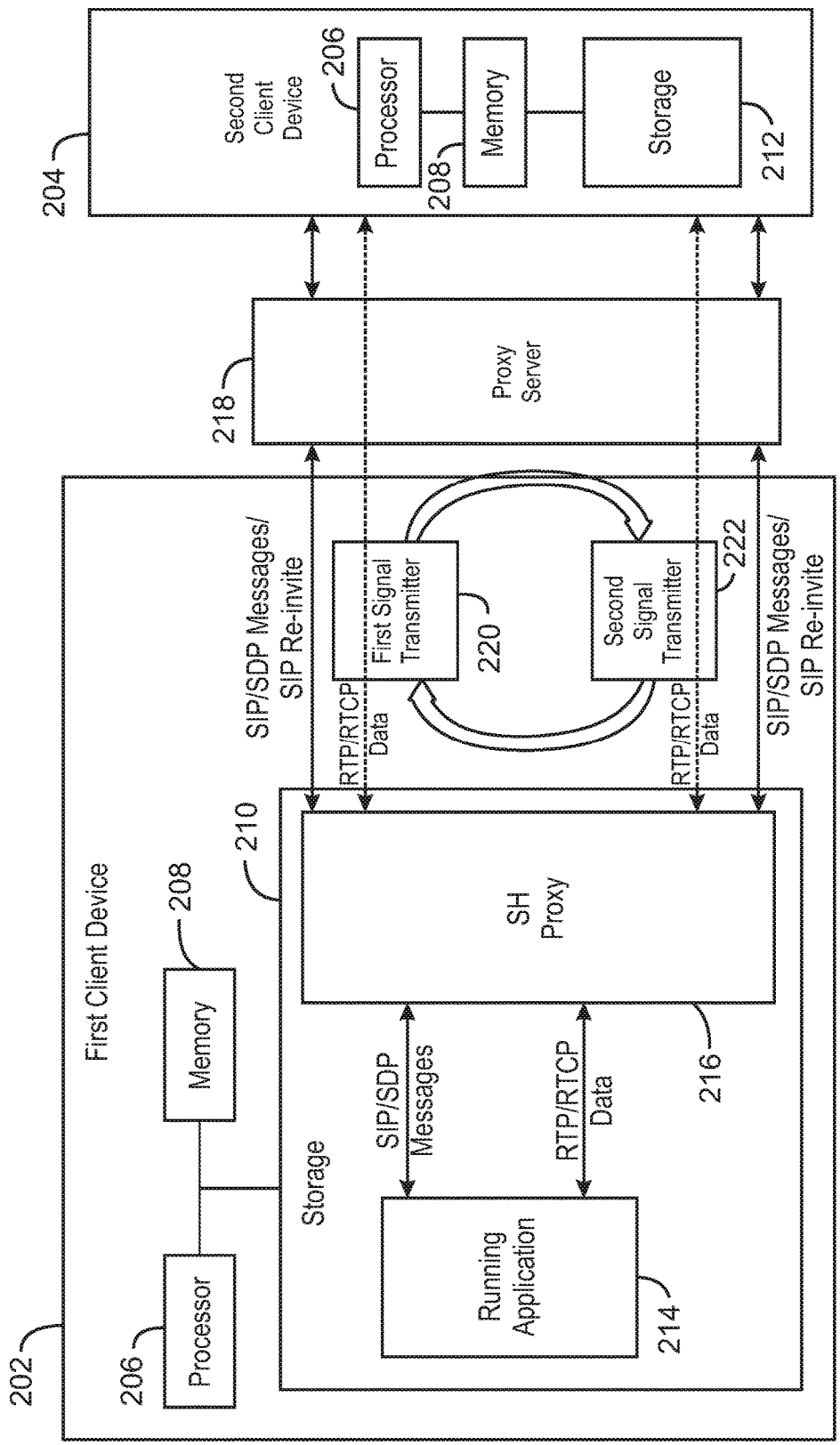
FIG. 2 is a diagram illustrating the handover of a running application between wireless networks.

FIG. 2 is a diagram 200 illustrating the handover of a running application between wireless networks. The diagram 200 includes a first client device 202 in communication with a second client device 204. The first client device 202 and second client device 204 each include a processor 206 and memory 208. The first client device 202 includes a storage device 210, and the second client device 204 includes a storage device 212. The storage device 210 on the first client device 202 may include a running application 214 and a Voice over Internet Protocol (VoIP) handover proxy 216. The running application 214 may be, for example, a VoIP based application, a video conferencing program, or any other kind of application program (App). In some examples, the running application 214 can include, but is not limited to, an SIP based application, an RTP based application, an RTCP based application, a Google Talk based application, a Skype based application, or any combination thereof. The VoIP handover proxy 216 is configured to make a connection to a proxy server 218 on behalf of the running application 214 over a currently available wireless network. The proxy server 218 is a server that acts as an intermediary for requests from the first client device 202, the second client device 204, or other client devices seeking access to particular resources.

The proxy server 218 is in communication with the VoIP handover proxy 216 and the second client device 204. When a connection is made to the proxy server 218, the VoIP handover proxy 216 relays messages and traffic on behalf of the running application 214 to the proxy server 218 and, through the proxy server 218, on to the second client device 204. The proxy server 218 can act as both a server and a client, in some examples, for purposes of making requests for another client. The proxy server 218 can be, for example, external to the first and second client devices 202, 204. In embodiments, the running application 214 is a VoIP based application that connects to the VoIP handover proxy 216, and the VoIP handover proxy 216 relays Session Initiation Protocol (SIP) or Session Description Protocol (SDP) messages and Real-Time Transport Protocol (RTP) or RTP Control Protocol (RTCP) voice traffic to the proxy server 218. A handover event occurs when data transmission between the first client device 202 and the second client device 204 is switched from one wireless network to another.

The first client device 202 includes a first signal transmitter 220 and a second signal transmitter 222. In some embodiments, the first signal transmitter 220 is for a WLAN, and the second signal transmitter 222 is for a WWAN. In some embodiments, the first signal transmitter 220 is for a WWAN, and the second signal transmitter 222 is for a WLAN. In some embodiments, the first signal transmitter 220 or the second signal transmitter 222 can be for WiMAX. A handover event switches the running application 214 from being transmitted by the first signal transmitter 220 over a first wireless network, to being transmitted by the second wireless transmitter 222 over a second wireless network. In embodiments, the first wireless network is WLAN, and the second wireless network is WWAN.

In embodiments, during the handover event, the running application 214, for example, a VoIP based application, maintains a session through the VoIP handover proxy 216, and the VoIP handover proxy 216 initiates, for example, SIP re-invite messages to the proxy server 218. The SIP re-invite messages to the proxy server 218 switches the active connection from, for example, WLAN to WWAN, while the running application 214 continuously transmits by initiating SIP re-invite messages to the proxy server 218 through the new active connection over a different network. During this process of switching the active connection, the running application 214 is unaware of the handover event, and maintains a single session with the VoIP handover proxy 216. In this way, a "make before break" connection is established. A make before break procedure ensures the switch between wireless networks during the handover event is completed over the new active connection before breaking the original active connection. The combination of "make before break" and SIP re-invite messages allows for the quality of the running application 214 to be transmitted consistently during the handover event.

The diagram 200 of FIG. 2 is not intended to indicate that the diagram 200 and client devices 202, 204 are to include all of the components shown in FIG. 2. Any number of additional components, such as additional client devices, applications, or transceivers, may be included within the diagram 200, depending on the details of the devices and specific implementation of the handover techniques described herein. Further, the items discussed are not limited to the functionalities mentioned, but the functions could be done in different places, or by different components. For example, the handover event is not limited to SIP, SDP, RTP, RTCP, or VoIP based applications, and can be extended to other protocols. The techniques can be extended to handover packet switched calls to circuit switched calls and vice versa, for example.

Figure 3:
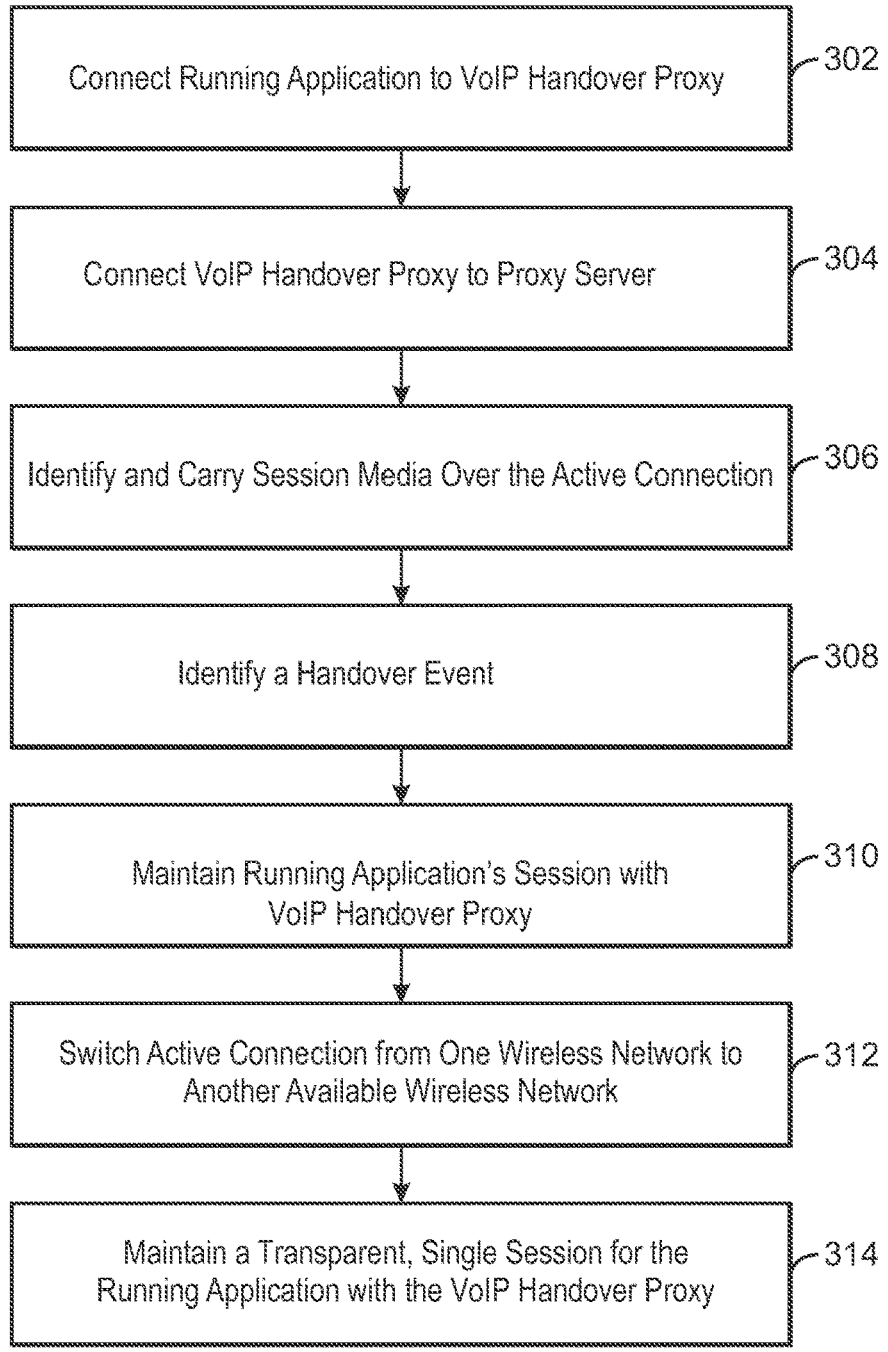
FIG. 3 is a process flow diagram of a method that implements an interface for handover of applications and network connections across heterogeneous wireless networks.

FIG. 3 is a process flow diagram of a method 300 that implements an interface for handover of applications and network connections across heterogeneous wireless networks. The method 300 can be performed, for example, by computer device 100 of FIG. 1, or between the client computer devices of FIG. 2.

The method 300 begins at block 302. At block 302, a running application connects to a VoIP handover proxy. The VoIP handover proxy is to implement a single interface for applications and network connections, internally handling the connections across heterogeneous wireless networks, for example, across WLAN and WWAN. In embodiments, the running application is a VoIP based application that is to connect to the VoIP handover proxy.

The method 300 continues at block 304, where the VoIP handover proxy connects to a proxy server. The VoIP handover proxy establishes the connection to the proxy server on behalf of the running application over a currently available wireless network. In embodiments, a transaction consists of a client request that invokes a particular method or function on the server proxy, and at least one response. In some embodiments, the server proxy can be a SIP/SDP proxy. SIP works in conjunction with several other application layer protocols that identify and carry session media. SIP has been developed and standardized in Request for Comments (RFC) 3261, and is well known.

At block 306, the method 300 continues by identifying and carrying session media over the established connection. In some embodiments, media identification and negotiation is achieved with the Session Description Protocol (SDP). In some embodiments, for the transmission of media streams (e.g., voice, audio), SIP typically employs the Real-time Transport Protocol (RTP) or Secure Real-time Transport Protocol (SRTP), for example. In embodiments, the connection is established and the VoIP handover proxy relays SIP/SDP messages and RTP/RTCP voice traffic to the proxy server and downstream client device accordingly.

The method 300 continues at block 308, where a handover event is identified. A handover event can occur, for example, when a current wireless network connection is no longer in range or sufficiently accessible, or there is congestion over the network, or when signal strength is diminishing while a new network is in range, for example. During a handover event a connection switch occurs between the current network and a network other than the current network.

After the handover event, the method 300 continues at block 310, where the running application's session is maintained with the VoIP handover proxy. Then at block 312, the method 300 continues where the active connection is switched from one wireless network to another currently available wireless network. In embodiments, the VoIP handover proxy initiates, for example, SIP re-invite messages to the proxy server while switching the active connection from one wireless network to another wireless network, for example, from WLAN to WWAN, from WLAN to WiMAX, from WWAN to WLAN, or any combination thereof. The handover can be a horizontal handover among the same type of network, for example, from one WLAN to another WLAN or one WWAN to another WWAN. The handover can be a vertical handover from one type of network to a network of a different type.

The method 300 continues at block 314, where a transparent, single session is maintained with the VoIP handover proxy for the running application. The running application is unaware of the handover event and the handover. The method 300 adheres to a "make before break" procedure, where, for example, the active connection is maintained until a second network connection is established, and the second or standby connection is sufficiently stable. For example, to achieve true handover, in some embodiments, a VoIP based application is maintained on the active connection until a standby connection's Quality of User Service/Experience (QoS/QoE) is measured and verified.

In some embodiments, when the standby wireless network is ready for the handover, the VoIP handover proxy sends SIP re-invite messages on the current active connection to the SIP proxy to hold the call. The SIP proxy then sets the standby wireless network as the active connection to resume the call, while simultaneously maintaining the original connection with the standby wireless network before terminating the original connection. In the example of switching from an active WLAN connection to an active WWAN connection, WLAN quality is measured and proactively moved to WWAN before losing the WLAN connection for handover of, for example, a VoIP call. The so-called "make before break" procedure described above reduces the handover time for the running application between the heterogeneous wireless networks.

The method 300 of FIG. 3 is not intended to indicate that method 300 is to include all of the steps shown in FIG. 3. Further, any number of additional steps may be included within the method 300, depending on the details and specific implementation of the handover techniques described herein.

Figure 4:
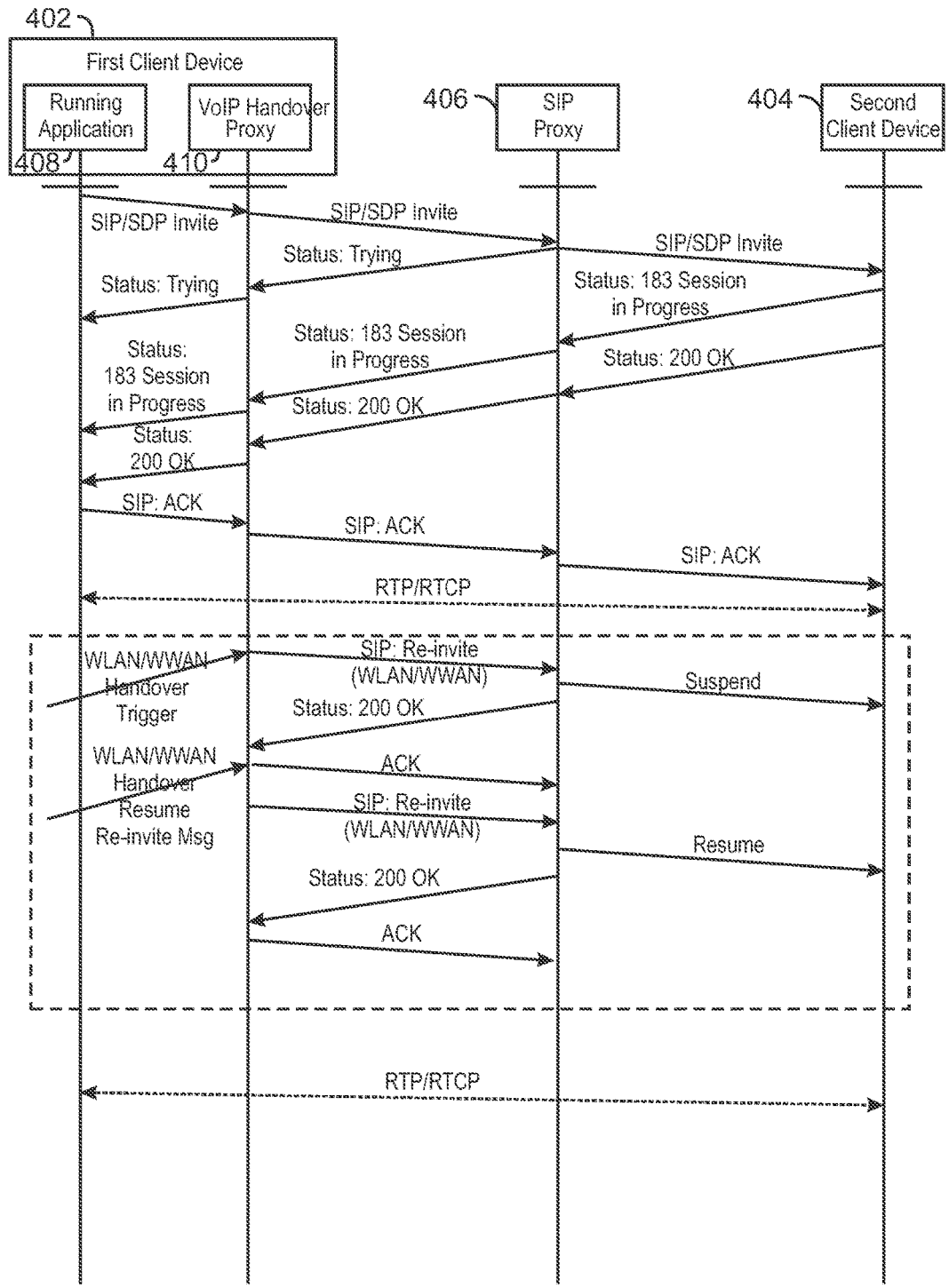
FIG. 4 is a schematic for the exchange of information between client devices, and the handover of an active connection between client devices.

FIG. 4 is a schematic 400 for the exchange of information between client devices, and the handover of an active connection between client devices. In some embodiments, components in FIG. 4 can be described with respect to similar components as in FIG. 2, for example. SIP is typically used for signaling during a communication session. In embodiments, SIP can be used in part for session initiation, control, and termination between client devices and servers. In embodiments, RTP is used in conjunction with RTCP to transfer data over the active connection. These protocols are designed for real-time transfer of stream data, for example, from one client device to another client device. In embodiments, RTP is used to carry media streams, for example, audio and video, of the running application. RTCP is used to monitor transmission statistics and quality of service (QoS) of the active connection, and is used to aid synchronization of multiple streams of data.

The schematic 400 includes a first client device 402, a second client device 404, and a SIP proxy 406. The first client device 402 includes a running application 408, for example, a VoIP application. The first client device 402 includes a VoIP handover proxy 410. The VoIP handover proxy 410 is configured to seamlessly handover the running application 408 from being transmitted to the second client device 404 over a first wireless network, for example, WLAN, to being transmitted to the second client device 404 over a second wireless network, for example, WWAN. The VoIP handover proxy 410 does not make any changes to the running application 408 during a handover event. In some embodiments, a SIP session is established between the first and second client devices 402, 404 without help of existing communication infrastructure technologies, such as VCC, IMS, and S2b, for example.

In embodiments, messages from the running application 408 are relayed by the VoIP handover proxy 410 to the SIP proxy 406 and second client device 404. A SIP session is established between the running application 408, the SIP proxy 406, and the second client device 404 through SIP/SDP invite messages. In embodiments, parameters, for example, port numbers, protocols, and codecs, for the running application's media streams are defined and negotiated using SDP, which is transported in a SIP packet body. A status message can be sent from the SIP proxy 406 to the VoIP handover proxy 410 and running application 408 that a session is trying to connect. When a connection is established, the second client device 404 can send a session in progress status message to the SIP proxy 410 that is relayed to the running application 408 on the first client device 402. SIP requests and responses can be based on the RFC 3261 standard. In embodiments, the second client device 404 can send a Status: 200 "OK" message along with the session in progress status message to the running application 408. The running application 408 can send a SIP: ACK response to the second client device 404, acknowledging the SIP connection. When the SIP connection is acknowledged, data, such as voice and audio information, for example, are transmitted with RTP/RTCP traffic from the first client device 402 to the second client device 404 through the SIP proxy 406.

In embodiments, when a handover event occurs, for example, due to device mobility or condition changes and the first client device 402 does not maintain a sufficient transmission of the running application 408 over a first wireless network, the VoIP handover proxy 410 is configured to send SIP re-invite messages, and initiate switching to a second wireless network. The VoIP handover proxy 410 is to relay SIP request and SIP response messages between the first client device 402, the SIP proxy 406, and the second client device 404. In embodiments, the VoIP handover proxy 410 sends SIP re-invite messages to the SIP proxy 406 when, for example, a WLAN/WWAN handover is triggered. The SIP proxy 406 sends a "Suspend" message to the second client device 404. The status of the SIP re-invite message is relayed to VoIP handover proxy 410, and an ACK response is returned to the SIP proxy 406.

In embodiments, the VoIP handover proxy 410 can provide the second client device 404 with a new IP address associated with a second wireless network, and the new SDP parameters to establish a new SIP session. A second re-invite message can be sent from the VoIP handover proxy 410 to the SIP proxy 406 that provides details of the second wireless connection, and a resume message can be relayed to the second client device 404. The session re-invite message may include the new SDP parameters to be used for the SIP session over the second wireless network. In response to the re-invite message, the second client device 404 may send a SIP session re-invitation success message to the VoIP handover proxy 410 via the SIP proxy 406. Data, such as voice and audio information, for example, continue to be transmitted with RTP/RTCP traffic from the first client device 402 to the second client device 404 through the SIP proxy 406. The active connection switches between wireless networks without significant loss in quality or strength of the transmission of the running application. The result of this process is a make-before-break SIP connection that allows a client computer device with wireless radio transmission capabilities to move seamlessly between wireless networks without losing a previously established SIP session.

In embodiments, make-before-break refers to a process in which a second SIP connection is established between clients and the SIP session traffic is transferred to the second connection before the first SIP connection is broken. This allows a seamless transfer between wireless networks so that, for example, a VoIP based call, Skype based call, Google Talk based call, or the like, is not dropped when a network change occurs.

Figure 5:
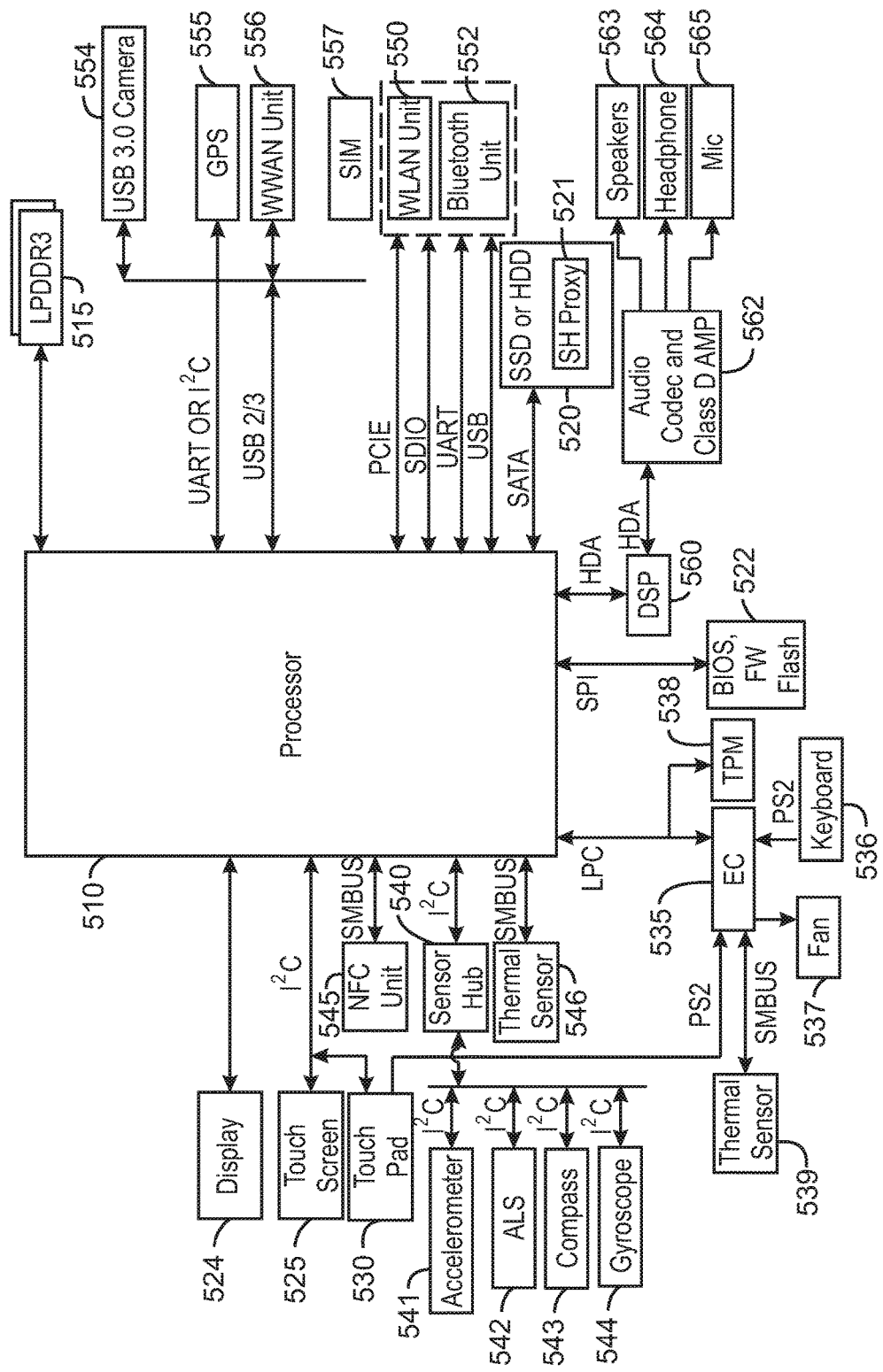
FIG. 5 is a block diagram of an exemplary computer system.

Referring now to FIG. 5, a block diagram of components present in a computer system in accordance with an embodiment of the present invention is illustrated. As shown in FIG. 5, system 500 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 5 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 5, a processor 510, in one embodiment, includes a microprocessor, multi-core processor, multi-threaded processor, an ultra low voltage processor, an embedded processor, or other known processing element. In the illustrated implementation, processor 510 acts as a main processing unit and central hub for communication with many of the various components of the system 500. As one example, processor 500 is implemented as a system on a chip (SoC). As a specific illustrative example, processor 510 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 510 in one implementation will be discussed further below to provide an illustrative example.

Processor 510, in one embodiment, communicates with a system memory 515. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2GB and 16GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 520 may also couple to processor 510. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Mass storage 520 can include applications and modules, such as, for example, VoIP handover proxy 521 configured to implement the handover of wireless networks for a running application described herein. The VoIP handover proxy 521 relays signals and messages between, for example, system 500, network servers, and other computer devices. The VoIP handover proxy 521 is to maintain the transmission of a running application, for example, a voice-based application, while an active connection that uses one type of network is switched to transmit over another type of network. Also shown in FIG. 5, a flash device 522 may be coupled to processor 510, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320GB-4 terabytes (TB) and upward while the RST cache is implemented with a SSD having a capacity of 24GB-256GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120GB-1TB.

Various input/output (IO) devices may be present within system 500. Specifically shown in the embodiment of FIG. 5 is a display 524 which may be a high definition LCD or LED panel configured within a lid portion of the chassis. This display panel may also provide for a touch screen 525, e.g., adapted externally over the display panel such that via a user's interaction with this touch screen, user inputs can be provided to the system to enable desired operations, e.g., with regard to the display of information, accessing of information and so forth. In one embodiment, display 524 may be coupled to processor 510 via a display interconnect that can be implemented as a high performance graphics interconnect. Touch screen 525 may be coupled to processor 510 via another interconnect, which in an embodiment can be an I$^2$C interconnect. As further shown in FIG. 5, in addition to touch screen 525, user input by way of touch can also occur via a touch pad 530 which may be configured within the chassis and may also be coupled to the same I$^2$C interconnect as touch screen 525.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 510 in different manners.

Certain inertial and environmental sensors may couple to processor 510 through a sensor hub 540, e.g., via an I$^2$C interconnect. In the embodiment shown in FIG. 5, these sensors may include an accelerometer 541, an ambient light sensor (ALS) 542, a compass 543 and a gyroscope 544. Other environmental sensors may include one or more thermal sensors 546 which in some embodiments couple to processor 510 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

The system 500 can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

The OS for system 500 may be an Android based OS. The OS for system 500 may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 5, various peripheral devices may couple to processor 510 via a low pin count (LPC) interconnect. In the embodiment shown, various components can be coupled through an embedded controller 535. Such components can include a keyboard 536 (e.g., coupled via a PS2 interface), a fan 537, and a thermal sensor 539. In some embodiments, touch pad 530 may also couple to EC 535 via a PS2 interface. In addition, a security processor such as a trusted platform module (TPM) 538 in accordance with the Trusted Computing Group (TCG) TPM Specification Version 1.2, dated Oct. 2, 2003, may also couple to processor 510 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 500 can communicate with external devices in a variety of manners, including wirelessly. In the embodiment shown in FIG. 5, various wireless modules, each of which can correspond to a radio configured for a particular wireless communication protocol, are present. One manner for wireless communication in a short range such as a near field may be via a near field communication (NFC) unit 545 which may communicate, in one embodiment with processor 510 via an SMBus. Note that via this NFC unit 545, devices in close proximity to each other can communicate. For example, a user can enable system 500 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 5, additional wireless units can include other short range wireless engines including a WLAN unit 550 and a Bluetooth® unit 552. Using WLAN unit 550, Wi-Fi™ communications in accordance with a given Institute of Electrical and Electronics Engineers (IEEE) 802.11 standard can be realized, while via Bluetooth® unit 552, short range communications via a Bluetooth® protocol can occur. These units may communicate with processor 510 via, e.g., a USB link or a universal asynchronous receiver transmitter (UART) link. Or these units may couple to processor 510 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 556 which in turn may couple to a subscriber identity module (SIM) 557. In addition, to enable receipt and use of location information, a GPS module 555 may also be present. Note that in the embodiment shown in FIG. 5, WWAN unit 556 and an integrated capture device such as a camera module 554 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11 abgn) with support for Windows 8 CS. This card can be configured in an internal slot (e.g., via an NGFF adapter). An additional module may provide for capability (e.g., Bluetooth® 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth®, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 560, which may couple to processor 510 via a high definition audio (HDA) link. Similarly, DSP 560 may communicate with an integrated coder/decoder (CODEC) and amplifier 562 that in turn may couple to output speakers 563 which may be implemented within the chassis. Similarly, amplifier and CODEC 562 can be coupled to receive audio inputs from a microphone 565 which in an embodiment can be implemented via dual array microphones (such as a digital microphone array) to provide for high quality audio inputs to enable voice-activated control of various operations within the system. Note also that audio outputs can be provided from amplifier/CODEC 562 to a headphone jack 564. Although shown with these particular components in the embodiment of FIG. 5, understand the scope of the present invention is not limited in this regard.

The digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In embodiments, processor 510 includes one or more execution units to implement an algorithm that is to perform at least one instruction. The processor 510 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example.

Instructions executed by the processor can be, for example, to relay a running application on a first client device over an active connection to a SIP proxy server (not shown) and a second client device. In embodiments, instructions can be executed to transmit media of the running application over the active connection, identify a handover event, and maintain the active connection over a first wireless network between VoIP handover proxy 521 on mass storage 520, the SIP proxy server, and the second client device. During the handover event, instructions can be executed by the processor 510 to switch the active connection from the first wireless network to a second wireless network, and simultaneously maintain the active connection and transmission of media of the running application over the second wireless network. A "make before break" procedure ensures that the active connection is established over the second wireless network before the connection over the first wireless network is terminated.

The processor 510 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

The block diagram of FIG. 5 is not intended to indicate that the computing device 500 is to include all of the components shown in FIG. 5. Further, the computing device 500 may include any number of additional components not shown in FIG. 5, depending on the details of the specific implementation.

Figure 6:
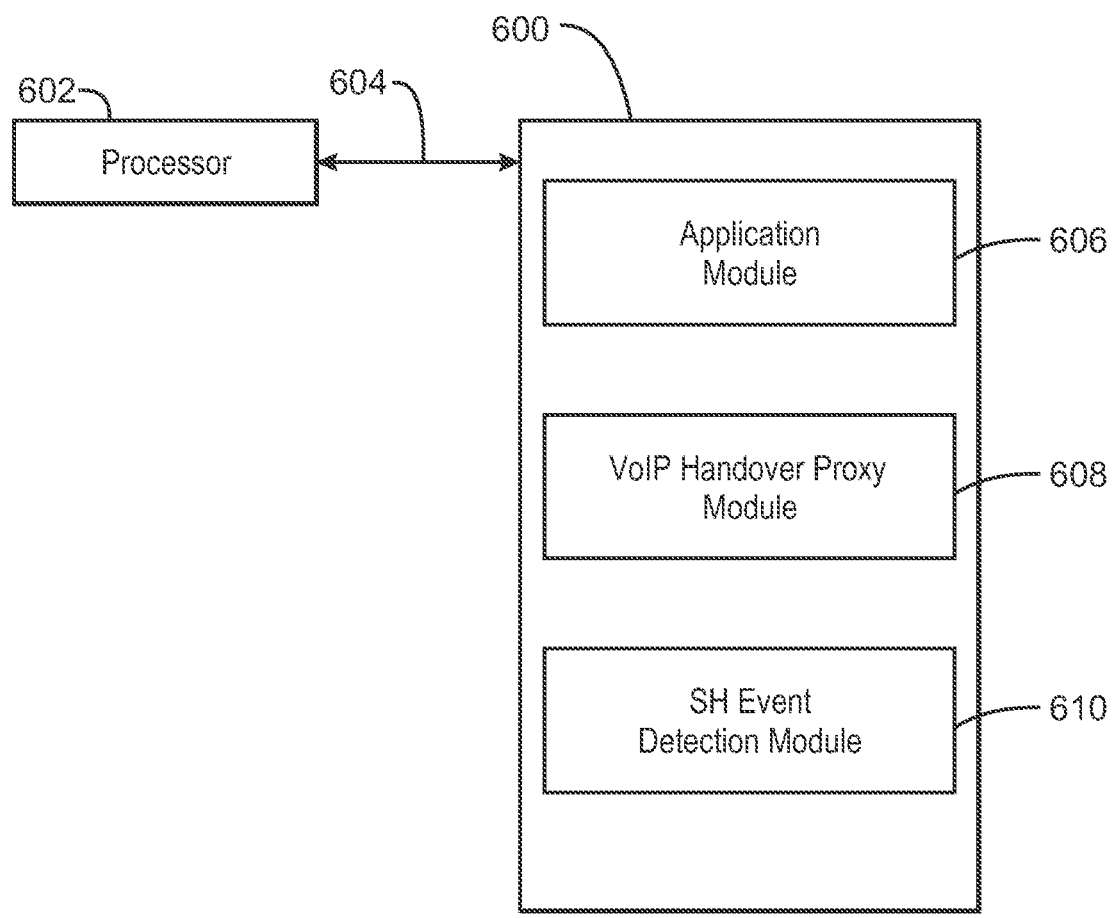
FIG. 6 is a block diagram showing tangible, non-transitory computer-readable media that store code for context sensing, in accordance with embodiments.

FIG. 6 is a block diagram showing tangible, non-transitory computer-readable media 600 that store code for context sensing, in accordance with embodiments. The tangible, non-transitory computer-readable media 600 may be accessed by a processor 602 over a computer bus 604. Furthermore, the tangible, non-transitory computer-readable media 600 may include code configured to direct the processor 602 to perform the techniques described herein.

The various software components discussed herein may be stored on the tangible, non-transitory computer-readable media 600, as indicated in FIG. 6. For example, an application module 606 may be configured to run an application, for example, a VoIP based application, and to send and receive data. In embodiments, the application module 606 makes no changes to a running application during a handover event. A handover (SH) proxy module 608 may be configured to initiate SIP/SDP invite messages that are sent to a SIP proxy server, and can be relayed to another computer device. The VoIP handover proxy module 608 may relay RTP and RTCP traffic, which also include packets of data sent from the application module 606 and to another computer device.

A handover (SH) event detection module 610 may be configured to detect when a handover event occurs, for example, when the transmission of the running application over the current wireless network may be problematic, such as if the signal becomes too weak or a lower cost interface is present. When a handover event is detected, the VoIP handover proxy module 608 is to send SIP re-invite messages on the current active connection to the SIP proxy server to hold the transmission, and then sets a standby or alternate wireless network signal as the active connection. The VoIP handover proxy module 608 can then sends SIP re-invite messages on the current active connection to resume the transmission over the standby wireless network. This "make-before-break" process ensures that the active connection is not lost, and transmission of the running application is continuous throughout the handover event.

The wireless networks that can be involved in the handover event include WLAN, WWAN, and WiMAX, to name a few. In the case when moving an active connection from WLAN to WWAN, WLAN quality can be measured by the VoIP handover proxy module 608, and the active connection can be proactively moved to WWAN before losing the WLAN connection. This process results in the handover, for example, of a call over a VoIP based application.

The block diagram of FIG. 6 is not intended to indicate that the tangible, non-transitory computer-readable media 600 are to include all of the components shown in FIG. 6. Further, the tangible, non-transitory computer-readable media 600 may include any number of additional components not shown in FIG. 6, depending on the details of the specific implementation.

Example 1 includes an apparatus for the handover of a transmission of a data application is described herein. The apparatus includes a computer device. The computer device includes a wireless receiver and a wireless transmitter. The data application is transmitted over a first wireless network. A Voice over Internet Protocol (VoIP) handover proxy on the computer device is to maintain the transmission of the data application while the transmission of the data application switches from being transmitted over the first wireless network to being transmitted over a second wireless network. The data application is not altered by the switch between wireless networks. Wireless networks can include WLAN, WWAN, or WiMAX, for example.

Example 2 incorporates the subject matter for Example 1. In this example, the data application includes a Voice over Internet Protocol (VoIP) based application, a Skype based application, a Google Talk based application, or a Session Initiation Protocol (SIP) based application.

Example 3 incorporates the subject matter of any combination of Examples 1-2. In this example, the VoIP handover proxy relays Session Initiation Protocol (SIP) requests, SIP responses, and Real-Time Transport Protocol (RTP) and RTP Control Protocol (RTCP) based traffic between the data application on the computer device, a SIP server, and a second computer device.

Example 4 incorporates the subject matter of any combination of Examples 1-3. In this example, the SIP protocol is according to Request for Comments (RFC) 3261.

Example 5 incorporates the subject matter of any combination of Examples 1-4. In this example, no changes are made to the data application.

Example 6 incorporates the subject matter of any combination of Examples 1-5. In this example, the handover can be a vertical handover between different types of wireless networks, or the handover can be a horizontal handover between the same type of wireless network.

Example 7 incorporates the subject matter of any combination of Examples 1-6. In this example, the safety component includes a rectifier coupled to the first receiving coil to receive wireless power from the first receiving coil. The safety component also includes a communicative coupling between the rectifier and a capacitor associated with the second receiving coil, wherein the capacitor is to detune the second receiving coil in response to power received at the rectifier.

Example 8 is a method to configure a handover between wireless networks while transparently transmitting a running application. The method includes relaying, through a VoIP handover proxy on a first client device, the running application on the first client device over an active connection to a proxy server and a second client device. The method includes transmitting media of the running application over the active connection. The method includes identifying a handover event. The method includes maintaining the active connection over a first wireless network between the VoIP handover proxy, the proxy server, and the second client device. The method includes switching the active connection from the first wireless network to a second wireless network. The method also includes maintaining the active connection and transmission of media of the running application over the second wireless network.

Example 9 incorporates the subject matter of Example 8. In this example, a session is terminated over the first wireless network after the active connection has been switched and is transmitting over the second wireless network.

Example 10 incorporates the subject matter of any combination of Examples 8-9. In this example, the first wireless network comprises a wireless local area network (WLAN), a wireless wide area network (WWAN), or Worldwide Interoperability for Microwave Access (WiMAX), and the first wireless network comprises a WWAN, a WLAN, or WiMAX.

Example 11 incorporates the subject matter of any combination of Examples 8-10. In this example, the VoIP handover proxy relays Session Initiation Protocol (SIP) requests, SIP responses, and Real-Time Transport Protocol (RTP) and RTP Control Protocol (RTCP) based traffic between the running application on the first client device, the proxy server, and the second client device.

Example 12 includes at least one machine readable medium having instructions stored therein that, in response to being executed on a computing device, cause the computing device to relay a running application on a first client device over an active connection to a SIP proxy server and a second client device. The executed instructions cause the computing device to transmit media of the running application over the active connection. The executed instructions cause the computing device to identify a handover event, and maintain the active connection over a first wireless network between a VoIP handover proxy, the SIP proxy server, and the second client device. The executed instructions cause the computing device to switch the active connection from the first wireless network to a second wireless network, and maintain the active connection and transmission of media of the running application over the second wireless network without modifying the running application.

Example 13 incorporates the subject matter of any combination of Examples 11-12. In this example, the VoIP handover proxy relays Session Initiation Protocol (SIP) requests and SIP responses between the running application on the first client device, the SIP proxy server, and the second client device.

Example 14 incorporates the subject matter of any combination of Examples 11-13. In this example, the VoIP handover proxy relays Real-Time Transport Protocol (RTP) and RTP Control Protocol (RTCP) based traffic between the running application on the first client device and the second client device Example 15 incorporates the subject matter of any combination of Examples 11-14. In this example, the first wireless network comprises a wireless local area network (WLAN).

Example 16 incorporates subject matter of any combination of Examples 11-15. In this example, the first wireless network comprises a wireless wide area network (WWAN).

Example 17 incorporates the subject matter of any combination of Examples 11-16. In this example, the first wireless network comprises Worldwide Interoperability for Microwave Access (WiMAX).

Example 18 incorporates the subject matter of any combination of Examples 11-17. In this example, the second wireless network comprises a wireless local area network (WLAN).

Example 19 incorporates subject matter of any combination of Examples 11-18. In this example, the second wireless network comprises a wireless wide area network (WWAN).

Example 20 incorporates the subject matter of any combination of Examples 11-19. In this example, the second wireless network comprises Worldwide Interoperability for Microwave Access (WiMAX).

Example 21 incorporates the subject matter of any combination of Examples 11-20. In this example, the running application comprises a voice over internet protocol (VoIP) based application.

Example 22 incorporates the subject matter of any combination of Examples 11-21. In this example, the running application comprises an SIP based application.

Example 23 incorporates the subject matter of any combination of Examples 11-22. In this example, the running application comprises a Skype based application.

Example 24 incorporates the subject matter of any combination of Examples 11-23. In this example, the running application comprises a Google Talk based application.

Example 25 includes an apparatus for continuously transmitting a running application when switching a transmission between a first wireless network and a second wireless network. The apparatus includes a Voice over Internet Protocol (VoIP) handover proxy on a first client device for relaying the running application on the first client device over an active connection to a proxy server and a second client device. The apparatus includes means for transmitting media of the running application over the active connection. The apparatus includes means for identifying a handover event.

The apparatus includes means for maintaining the active connection over a first wireless network between the handover proxy, the proxy server, and the second client device. The apparatus includes means for switching the active connection from the first wireless network to a second wireless network. The apparatus also includes means for maintaining the active connection and transmission of media of the running application over the second wireless network.

Example 26 incorporates the subject matter of Example 25. In this example, the VoIP handover proxy relays Session Initiation Protocol (SIP) requests, SIP responses, and Real-Time Transport Protocol (RTP) and RTP Control Protocol (RTCP) based traffic between the running application on the first client device, the proxy server, and the second client device.

Example 27 incorporates the subject matter of any combination of Examples 25-26. In this example, the first wireless network comprises wireless local area network (WLAN), wireless wide area network (WWAN), or Worldwide Interoperability for Microwave Access (WiMAX).

Example 28 incorporates the subject matter of any combination of Examples 25-27. In this example, the second wireless network comprises WLAN, WWAN, or WiMAX.

Example 29 incorporates the subject matter of any combination of Examples 25-28. In this example, the running application comprises a VoIP based application.

Example 30 incorporates the subject matter of any combination of Examples 25-29. In this example, the running application comprises an SIP based application.

Example 31 incorporates the subject matter of any combination of Examples 25-30. In this example, the running application comprises a Skype based application.

Example 32 incorporates the subject matter of any combination of Examples 25-31. In this example, the running application comprises a Google Talk based application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

Some embodiments may be implemented in one or a combination of hardware, firmware, and software. The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A client device comprising:
    a voice-over-IP (VoIP) application; and
    a handover proxy to make a connection to a proxy server outside the client device on behalf of the VoIP application over a first wireless network, wherein the proxy server is in communication with a second client device, the handover proxy to further:
        establish a session between the VoIP application and the proxy server;
        relay session initiation protocol (SIP) or session description protocol (SDP) messages and real time transport protocol (RTP) or RTP control protocol (RTCP) voice traffic to the proxy server;
        maintain the session between the proxy server and the VoIP application while initiating SIP-reinvite messages to the proxy server to put a call on hold in response to a handover event from the first wireless network to a second wireless network;
        switch the active connection from the first wireless network to the second wireless network; and
        resume the call by initiating SIP re-invite messages to the proxy server through the new connection.

2. The client device of claim 1, wherein the session between the VoIP application and the proxy server is established by:
    sending SIP or SDP invite messages by the VoIP application to the proxy server, wherein the proxy server send the SIP or SDP invite messages to the second client device;
    receiving a session in progress message; and
    sending an acknowledgement by the VoIP application to the proxy server.

3. The client device of claim 1, wherein the handover proxy further:
sends the SIP re-invite messages to the proxy server;
sends a "suspend" message to the second client device;
receives a status of the SIP re-invite message; and
sends an ACK response to the proxy server.

4. The client device of claim 3, wherein the handover proxy further:
provides the second client device with new internet protocol (IP) address associated with the second wireless network; and
sends a second re-invite message to the proxy server that is to be relayed to the second client device, wherein the second re-invite message contains new SDP parameters to establish a new SIP session over the second wireless network.

5. The apparatus of claim 1, wherein first wireless network comprises a wireless local area network (WLAN) and the second wireless network comprises a wireless wide area network (WWAN).

6. The apparatus of claim 1, wherein the first wireless network comprises a WWAN and the second wireless network comprises a wireless local area network (WLAN).

7. The apparatus of claim 1, wherein either the first wireless network or the second wireless network comprises Worldwide Interoperability for Microwave Access (WiMAX).

8. The client device of claim 1, further comprising:
a first wireless transceiver to communicate via the first wireless network;
a second wireless transceiver to communicate via the second wireless network.

9. A method comprising:
connecting an application to a handover proxy, the application and handover proxy being inside a client device, wherein the handover proxy interfaces to a wireless network;
establishing a connection between the handover proxy and a proxy server over the wireless network, wherein the proxy server is outside the client device;
identifying and carrying session media over the connection, wherein the handover proxy relays session initiation protocol (SIP) or session description protocol (SDP) messages and real time transport protocol (RTP) or RTP control protocol (RTCP) voice traffic to the proxy server and a second client device;
identifying a handover event between the wireless network and a second wireless network; and
switching the connection from the wireless network to the second wireless network while maintaining a session between the application and the handover proxy, wherein the application is unaware of the connection switch;
wherein a Quality of User Service/Experience (QoS/QoE) on a second active connection between the application and the second client device over the second wireless network is measured and verified before releasing the connection.

10. The method of claim 9, further comprising terminating a session over the first wireless network after the connection has been switched from a first active connection to the second active connection and is transmitting over the second wireless network.

11. The method of claim 9, further comprising sending, by the handover proxy, SIP re-invite messages on the connection to the proxy server to hold a call between the client device and the second client device;
wherein the proxy server sets the second wireless network as the second connection to resume the call while simultaneously maintaining the connection with the first wireless network before terminating the connection.

12. The method of claim 9, wherein the first wireless network comprises a wireless local area network (WLAN) and the second wireless network comprises a wireless wide area network (WWAN).

13. The method of claim 9, wherein the first wireless network comprises a WWAN.

14. The method of claim 9, wherein the second wireless network comprises a WLAN.

15. The method of claim 9, wherein either the first wireless network or the second wireless network comprises Worldwide Interoperability for Microwave Access (WiMAX).

16. The method of claim 9, wherein switching the active connection comprises a vertical handover between different types of wireless networks.

17. The method of claim 9, wherein switching the active connection comprises a horizontal handover between the same type of wireless network.

18. The method of claim 9, wherein the VoIP handover proxy relays Session Initiation Protocol (SIP) requests, SIP responses, and Real-Time Transport Protocol (RTP) and RTP Control Protocol (RTCP) based traffic between the running application on the first client device, the proxy server, and the second client device.

19. At least one machine readable medium having instructions stored therein that, in response to being executed on a computing device, cause the computing device to:
establish a session between a voice-over internet protocol (VoIP) application and a proxy server, wherein the VoIP application is part of a client device and the proxy server is external to the client device;
relay session initiation protocol (SIP) or session description protocol (SDP) messages and real time transport protocol (RTP) or RTP control protocol (RTCP) voice traffic to the proxy server;
maintain the session between the proxy server and the VoIP application while initiating SIP-reinvite messages to the proxy server to put a call on hold in response to a handover event from the first wireless network to a second wireless network;
switch the active connection from a first wireless network to a second wireless network; and
resume the call by initiating SIP re-invite messages to the proxy server through the new connection.

20. The at least one machine readable medium of claim 19, wherein the VoIP handover proxy relays SIP requests, SIP responses, and RTP and RTCP based traffic between the VoIP application on the client device, the proxy server, and a second client device.

21. The at least one machine readable medium of claim 19, wherein the first wireless network comprises wireless local area network (WLAN), wireless wide area network (WWAN), or Worldwide Interoperability for Microwave Access (WiMAX).

22. The at least one machine readable medium of claim 19, wherein the second wireless network comprises WLAN, WWAN, or WiMAX.

23. The at least one machine readable medium of claim 19, wherein the VoIP application comprises a SIP based application, a Google Talk based application, or a Skype based application.

* * * * *